United States Patent
Galmiche et al.

(10) Patent No.: US 10,505,433 B2
(45) Date of Patent: Dec. 10, 2019

(54) SQUIRREL-CAGE ROTOR, AND ASYNCHRONOUS MOTOR COMPRISING SUCH A ROTOR

(71) Applicant: GE Energy Power Conversion Technology Limited, Warwickshire (GB)

(72) Inventors: Christophe Galmiche, Toul (FR); Pierre Humbert, Gremecey (FR); Christophe Klinger, Nancy (FR)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 300 days.

(21) Appl. No.: 15/546,930

(22) PCT Filed: Jan. 20, 2016

(86) PCT No.: PCT/EP2016/051098
§ 371 (c)(1),
(2) Date: Jul. 27, 2017

(87) PCT Pub. No.: WO2016/120133
PCT Pub. Date: Aug. 4, 2016

(65) Prior Publication Data
US 2018/0026505 A1    Jan. 25, 2018

(30) Foreign Application Priority Data
Jan. 27, 2015   (EP) .................................... 15305089

(51) Int. Cl.
*H02K 17/00*   (2006.01)
*H02K 17/16*   (2006.01)

(52) U.S. Cl.
CPC .................... *H02K 17/165* (2013.01)

(58) Field of Classification Search
CPC ....... H02K 17/165; H02K 17/18; H02K 19/14
(Continued)

(56) References Cited

U.S. PATENT DOCUMENTS 5,530,310 A * 6/1996 Sauer .................. H02K 17/165
                                              310/211
6,734,588 B2 * 5/2004 Leonov .................... H02K 3/51
                                              310/179
(Continued)

FOREIGN PATENT DOCUMENTS

EP    0 546 197 A1    6/1993
EP    0 628 675 A1    12/1994
(Continued)

OTHER PUBLICATIONS

Extended European Search Report and Opinion issued in connection with corresponding EP Application No. 15305089.3 dated Aug. 10, 2015.
(Continued)

*Primary Examiner* — Thanh Lam
(74) *Attorney, Agent, or Firm* — Wood IP LLC

(57) ABSTRACT

An electric machine rotor, which extends along an axis of rotation, including a short-circuit cage, the or each first connection means between a respective first end part of the or each bar and the first short-circuit ring includes a plurality of flexible electrically conductive blades.

11 Claims, 3 Drawing Sheets

(58) Field of Classification Search
USPC .................................. 310/211, 71, 210, 212
See application file for complete search history.

(56) References Cited

U.S. PATENT DOCUMENTS

| | | | | |
|---|---|---|---|---|
| 7,451,538 B2* | 11/2008 | Pizzichil | ............ | H02K 15/0012 |
| | | | | 29/596 |
| 2012/0228985 A1* | 9/2012 | Hayahi | .............. | H02K 15/0012 |
| | | | | 310/211 |
| 2013/0187511 A1* | 7/2013 | Lipot | ................. | H02K 15/0012 |
| | | | | 310/211 |
| 2016/0211708 A1* | 7/2016 | Bittermann | .............. | H02K 1/22 |

FOREIGN PATENT DOCUMENTS

| | | |
|---|---|---|
| EP | 2 615 726 A1 | 7/2013 |
| GB | 268355 A | 11/1927 |
| JP | S63-1352 A | 1/1988 |

OTHER PUBLICATIONS

International Search Report and Written Opinion issued in connection with corresponding PCT Application No. PCT/EP2016/051098 dated Jun. 22, 2016.

* cited by examiner

US 10,505,433 B2

SQUIRREL-CAGE ROTOR, AND ASYNCHRONOUS MOTOR COMPRISING SUCH A ROTOR

BACKGROUND OF THE INVENTION

Embodiments of the present invention relate to a rotor for an electric machine, extending along an axis of rotation and comprising a short-circuit cage having at least one bar and at least one first electrical short-circuit ring, the or each bar having a first end part, the first end part being connected to the first short-circuit ring electrically by a first connection means and radially with respect to the axis of rotation.

Embodiments of the present invention also relate to an electric machine, in particular an asynchronous machine, particularly a motor, comprising a stator and a rotor of this type.

A rotor of the aforementioned type is known from document EP 0 628 675 A1.

The rotor comprises a magnetic mass extending along the axis of rotation and a short-circuit cage. The short-circuit cage comprises two short-circuit rings placed on either side of the magnetic mass along the axis of rotation and a plurality of electrically conductive round bars intended to electrically connect the two short-circuit rings.

The ends of the round bars are disposed freely in circular orifices formed in the short-circuit rings.

However, the free arrangement of the ends of the bars in the orifices formed in the short-circuit rings does not make it possible to guarantee electrical contact under all conditions of use, in particular for low speeds of rotation of the rotor, in which case the centrifugal force is not sufficient to assure a contact pressure between ends of bars and short-circuit rings allowing electrical current to flow without sparking and without overheating.

Embodiments of the present invention is therefore to propose an electric machine rotor making it possible to improve the electrical contact between the bars and the rings of the short-circuit cage.

To this end, embodiments of the invention relate to a rotor of the aforementioned type, in which the or each first connection means between a respective first end part of the or of each bar and the first short-circuit ring comprises a plurality of flexible electrically conductive blades.

SUMMARY OF THE INVENTION

In accordance with further aspects of embodiments of the invention, the rotor comprises one or more of the following features, taken individually or in any technically feasible combination: the short-circuit cage comprises a second electrical short-circuit ring, the or each bar having a second end part, the second end part being connected to the second short-circuit ring electrically by a second connection means and radially with respect to the axis of rotation, the or each second connection means between a respective second end part and the second short-circuit ring also comprising a plurality of flexible electrically conductive blades.

The flexible blades of a respective connection means are disposed along at least half of the periphery, in a transverse plane perpendicular to the axis of rotation, of the part of the or of each corresponding end part, along at least three quarters of the periphery in the transverse plane of said end part, more particularly along substantially the entire periphery in the transverse plane of said end part.

Each flexible blade is movable in rotation about a pivot axis substantially parallel to the axis of rotation; the flexible blades of a respective connection means are mechanically and electrically connected to one another by at least one holding strip; the flexible blades of a respective connection means are divided into a first set and a second set, the blades of the first set being connected to one another by a first holding strip and the blades of the second set being connected to one another by a second holding strip.

The blades of the first set are movable in rotation about the pivot axis thereof in a first direction, and the blades of the second set are movable in rotation about the pivot axis thereof in a second direction, which is opposite the first direction. At least one connection means comprises a bushing and at least two groups of electrically conductive flexible blades connected to the bushing, at least one first group of blades being received at the outer periphery of the bushing and in abutment against the respective short-circuit ring, and at least one second group of blades being received at the inner periphery of the bushing and in abutment against the respective end part of the corresponding bar. The flexible blades of a respective connection means are received in a hollow formed in the respective short-circuit ring and in abutment against the respective end part of the corresponding bar; the flexible blades of a respective connection means are received in a hollow formed in the respective end part of the corresponding bar and in abutment against the respective short-circuit ring.

Embodiments of the present invention also relate to an electric machine, in particular an asynchronous machine, particularly a motor, comprising a stator and a rotor as defined above.

BRIEF DESCRIPTION OF THE DRAWINGS

These features and advantages of embodiments of the invention will become clearer upon reading the following description, which is given solely by way of non-limiting example and with reference to the accompanying drawings, in which:

FIG. 5 is a view similar to that from FIG. 2 in accordance with; and

FIG. 6 is a view similar to that from FIG. 2 in accordance with.

DETAILED DESCRIPTION OF THE INVENTION

As is conventional, in the present application the expression "substantially equal to" shall imply equality to within 5% in either direction.

Figure 1:
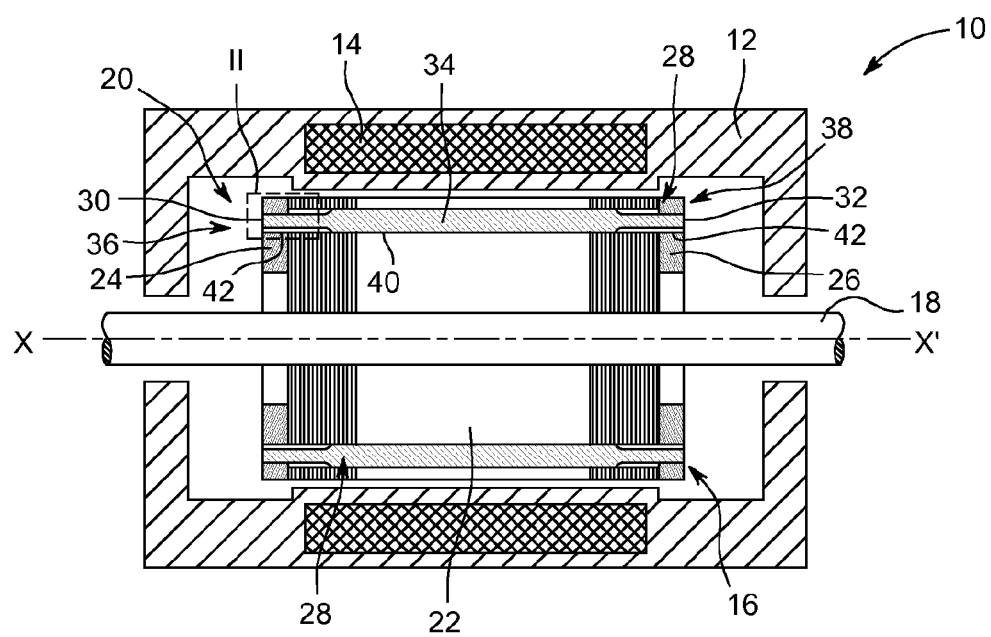
FIG. 1 is a schematic axial sectional view of an electric machine the machine comprising a stator and a rotor, the rotor comprising a short-circuit cage having a plurality of conductive bars, two short-circuit rings and flexible blades arranged between the ends of each respective bar and the corresponding short-circuit ring.

FIG. 1 shows an electric machine according to embodiments of the invention, denoted by the general reference 10. The electric machine 10 is y an asynchronous machine, in particular an asynchronous motor.

The machine 10 comprises a casing 12, a stator 14, a rotor 16 and a shaft 18.

The machine 10 is designed to operate at very high speeds, for example speeds ranging from 3,000 revolutions per minute to 20,000 revolutions per minute. The machine 10 has a strong electrical power, for example greater than 10 megawatts (MW), greater than 50 MW.

The casing 12 and the stator 14 are known elements and therefore are not described in greater detail.

The rotor 16 extends along an axis of rotation X-X' also referred to as the longitudinal axis. Hereinafter, the terms "axially", "radially" and "circumferentially" will be used with respect to the axis X-X'.

The rotor 16 is connected to the shaft 18 and comprises a short-circuit cage 20 and a magnetic mass 22.

The rotor 16 is a rotor of significant mass, for example greater than 1,000 kilograms (kg), greater than 10,000 kilograms (kg).

The short-circuit cage 20 comprises a first electrical short-circuit ring 24 and a second electrical short-circuit ring 26. The short-circuit cage 20 comprises a plurality of electrically conductive bars 28 intended to electrically connect the two short-circuit rings 24, 26, each bar 28 comprising a first end part 30, a second end part 32 and a middle part 34 extending between the end parts 30, 32.

The short-circuit cage 20 comprises, for each conductive bar 28, a first connection means 36 disposed between the first end part 30 and the first short-circuit ring 24 in order to electrically connect the first end part 30 to the first short-circuit ring 24 radially with respect to the axis of rotation X-X'.

In addition, the short-circuit cage 20 comprises, for each conductive bar 28, a second connection means 38 disposed between the second end part 32 and the second short-circuit ring 26 in order to electrically connect the second end part 32 to the second short-circuit ring 26 radially with respect to the axis of rotation X-X'.

The magnetic mass 22 comprises a stack of rotor laminations and a device (not shown) for holding the stack. The magnetic mass 22 extends along the longitudinal axis X-X' and is delimited by a periphery.

The magnetic mass 22 comprises a plurality of seats 40 for the bars 28.

The first short-circuit ring 24 and the second short-circuit ring 26 are identical or substantially identical.

Each short-circuit ring 24, 26 is a circular disk disposed coaxially with the axis of rotation X-X'. The first short-circuit ring 24 is disposed on one axial side of the magnetic mass 22, whereas the second short-circuit ring 26 is disposed on the other axial side of the magnetic mass 22.

Each short-circuit ring 24, 26 is fixed axially with respect to the magnetic mass 22 or with respect to the shaft 18. Each short-circuit ring 24, 26 is for example shrink fitted onto the shaft 18 or fixed to the magnetic mass 22. In a variant, the short-circuit ring 24, 26 is fixed to any other intermediate piece connected to the shaft 18 or the magnetic mass 22.

Each short-circuit ring 24, 26 is for example made of metal, made of copper. Each short-circuit ring 24, 26 is made integrally, in particular from one piece.

Each short-circuit ring 24, 26 is provided with a plurality of axial cavities 42. Each axial cavity 42 is able to receive a respective bar 28.

Each bar 28 is formed integrally, and in particular from one piece. The bars 28 are for example made of metal, for example copper.

The bars 28 are disposed parallel to the axis of rotation X-X'. In addition, the middle part 34 of the bars has for example a circular section or, in a variant, a rectangular or substantially rectangular section.

The end parts 30, 32 of the conductive bar have, for example, a substantially circular section (FIG. 3) in a transverse plane, perpendicular to the axis of rotation X-X'. In a variant the end parts 30, 32 of the conductive bar have a substantially rectangular section (FIG. 4) in the transverse plane. In a further variant (not shown) the end part 30, 32 of the conductive bar have a trapezoidal section in said transverse plane.

Figure 2:
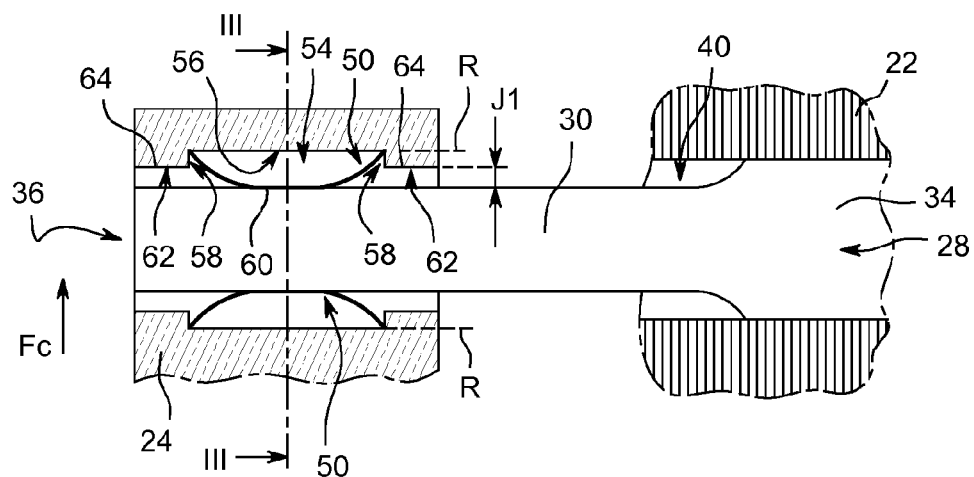
FIG. 2 is an enlargement of the framed zone II from FIG. 1.

Each first connection means 36 comprises a plurality of electrically conductive flexible blades 50, as shown in FIG. 2.

In addition, each second connection means 38 also comprises a plurality of electrically conductive flexible blades 50.

In FIG. 2 only the first short-circuit ring 24, the first end part 30 of a given conductive bar, and the first corresponding connection means 36 have been shown by way of simplification, and a person skilled in the art will understand that the arrangement of the second short-circuit ring 26, of the second end part 32, and of the corresponding second connection means 38 is similar to that of the first short-circuit ring 24, the first end part 30, and of the first connection means 36, visible in FIG. 2.

Figure 3:
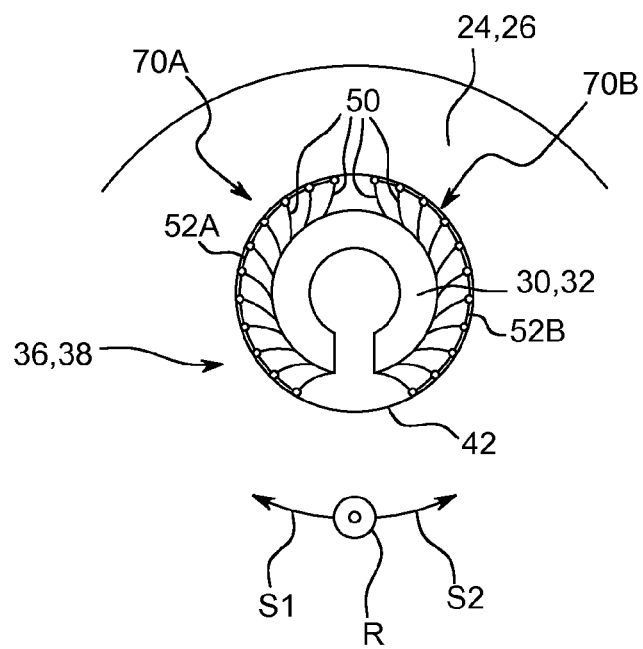
FIG. 3 is a schematic sectional view along the plane III from FIG. 2.

The flexible blades 50 of a respective connection means 36, 38 are disposed along at least half of the periphery, in the transverse plane perpendicular to the axis of rotation X-X', of the corresponding end part 30, 32. In the example of FIG. 3, the flexible blades 50 of a respective connection means 36, 38 are disposed along substantially the entire periphery of said end part 30, 32.

Each flexible blade 50 is movable in rotation about a pivot axis R, visible in FIG. 2 and substantially parallel to the axis of rotation X-X'.

The blades 50 of a respective connection means 36, 38 are for example all movable in rotation about the pivot axis R thereof in the same direction when they are pressed between the corresponding end part 30, 32 of the conductive bar and the corresponding short-circuit ring 24, 26. In a variant, as will be described hereinafter in greater detail with reference to FIGS. 3 and 4, the blades 50 of a respective connection means 36, 38 are divided into a number of sets with directions of rotation about the pivot axis R thereof that are different from one another.

Figure 4:
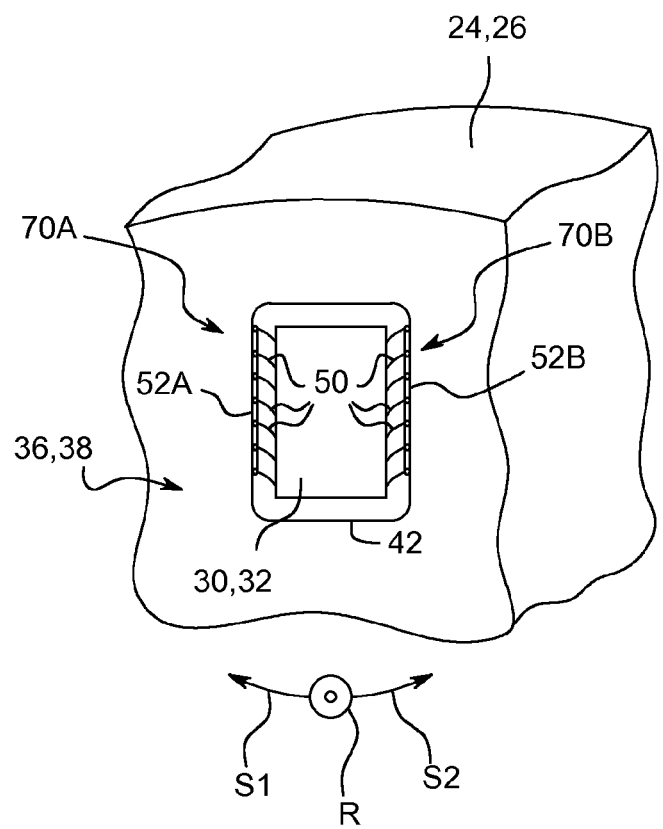
FIG. 4 is a view similar to that from FIG. 3 in accordance with a variant embodiment.

The flexible blades 50 of a respective connection means 36, 38 are for example mechanically and electrically connected to one another by a holding strip 52, as shown in FIGS. 3 and 4.

The flexible blades 50 are for example substantially V-shaped. The flexible blades 50 are made of copper, and the holding strip 52 is for example made of steel or of copper.

Each blade 50 has, for example, a measurement of 10 mm along the axis R and is thus able to allow the circulation of a current of 50 A.

In the exemplary embodiment of FIG. 2 the flexible blades 50 of a respective connection means 36, 38 are received in a hollow 54 formed in the respective short-circuit ring 24, 26 and are in abutment against the respective end part 30, 32 of the corresponding bar. The hollow 54 comprises a base 56 and two radial walls 58. The flexible blades 50 are held in the hollow 54 for example under prestress, being applied against the radial walls 58. In the unstressed state of the blades 50, these comprise a central part 60, which extends outside the hollow 54 and which is in abutment against the respective end part 30, 32 of the corresponding bar.

In a variant the flexible blades 50 are glued in the hollow 54 and do not require any prestress in the absence of the bars 28. In this case, in the absence of the bars 28, the blades 50 are not in contact with the radial walls 58.

In addition, the connection means 36, 38 comprise at least one stop 62 designed to limit a radial displacement of the end part 30, 32 under the centrifugal force Fc when the rotor 16 is driven in rotation, in order to limit the crushing of the flexible blades 50, whilst limiting the deflection and associated stress under centrifugal force of the bar 28. This stop 62 is for example formed by a surface of the short-circuit ring 24, 26, of which the normal is directed radially inwardly. In the present case, the stop 62 is formed by a wall 64 adjacent to the wall 58.

Thus, the connection means 36, 38, comprising the electrically conductive flexible blades 50, make it possible to ensure electrical contact between the corresponding end part 30, 32 of the conductive bar 28 and the corresponding short-circuit ring 24, 26, whatever the operating mode of the electric machine 10, including when the rotor 16 is not driven in rotation, or at low rotational speed.

When the rotor 16 is not driven in rotation the end part 30, 32 of the conductive bar is in abutment against the flexible blades 50, more specifically against the central part 60 of the blades.

In this state the end part 30, 32 and the associated short-circuit ring 24, 26 form a clearance J1 (FIG. 2) allowing a radial displacement outwardly of the end part 30, 32 against the force of some of the blades 50.

This clearance J1 between the stop 62 with its wall 64 and the end part 30, 32 as described previously limits the radial displacement of the end part 30, 32 under the centrifugal force Fc, thus limiting the stresses in the bar 28 and the blades 50.

The movability in rotation of the blades 50 about the pivot axis R makes it possible to further improve the electrical contact between the end part 30, 32 of the conductive bar and the short-circuit ring 24, 26.

In addition, in the exemplary embodiment of FIGS. 3 and 4, the flexible blades 50 of a respective connection means 36, 38 are divided into a first set 70A and into a second set 70B, the blades of the first set 70A being connected to one another by a first holding strip 52A and the blades of the second set 70B being connected to one another by a second holding strip 52B.

In the exemplary embodiment of FIGS. 3 and 4, the blades 50 of the first set 70A are movable in rotation about the pivot axis R thereof in a first direction S1 when they are pressed between the corresponding end part 30, 32 of the conductive bar and the corresponding short-circuit ring 24, 26. The blades 50 of the second set 70B are movable in rotation about the pivot axis R thereof in a second direction S2 when they are pressed between the corresponding end part 30, 32 of the conductive bar and the corresponding short-circuit ring 24, 26, the second direction S2 being opposite the first direction S1.

The division of the flexible blades 50 of a corresponding connection means 36, 38 into two sets 70A, 70B makes it possible to facilitate the insertion of said blades 50 between the corresponding end part 30, 32 of the conductive bar and the corresponding short-circuit ring 24, 26.

In addition, the particular arrangement of the two sets 70A, 70B such that the blades 50 of the two sets are movable in rotation about the pivot axis R thereof in the opposite directions S1, S2 of said sets makes it possible to further improve the electrical contact between the end part 30, 32 of the conductive bar and the corresponding short-circuit ring 24, 26. In effect, when the rotational speed of the rotor 16 rises and the centrifugal force Fc increases, the blades 50 of the first set 70A are prestressed more than the blades 50 of the second set 70B.

If the direction S1 for example had been selected for all the blades 50 of a single set 70 disposed along substantially the entire periphery of the end part 30, 32 of the conductive bar, a majority of the blades 50 of only a portion of the periphery would have been pressed to a greater extent against the end part 30, 32 by the effect of the centrifugal force Fc (left-hand part in FIG. 3), thus improving the quality of the contact pressure for an improved flow of electrical current. By contrast, the other portion of the blades 50 substantially diametrically opposite the first portion would have been pressed to a lesser extent against the end part 30, 32 by the effect of the centrifugal force Fc, which reduces the initial prestress force of the blades 50 during initial assembly thereof in the connection means 36, 38.

In other words, this particular arrangement of two sets 70A, 70B makes it possible to have electrical contact between the corresponding end part 30, 32 of the conductive bar and the corresponding short-circuit ring 24, 26, which electrical contact is less dependent on the rotational speed of the rotor 16 and the associated centrifugal force Fc and is substantially of the same quality (electrical contact pressure) along substantially the entire periphery of the end part 30, 32 of the conductive bar 28.

Figure 5:
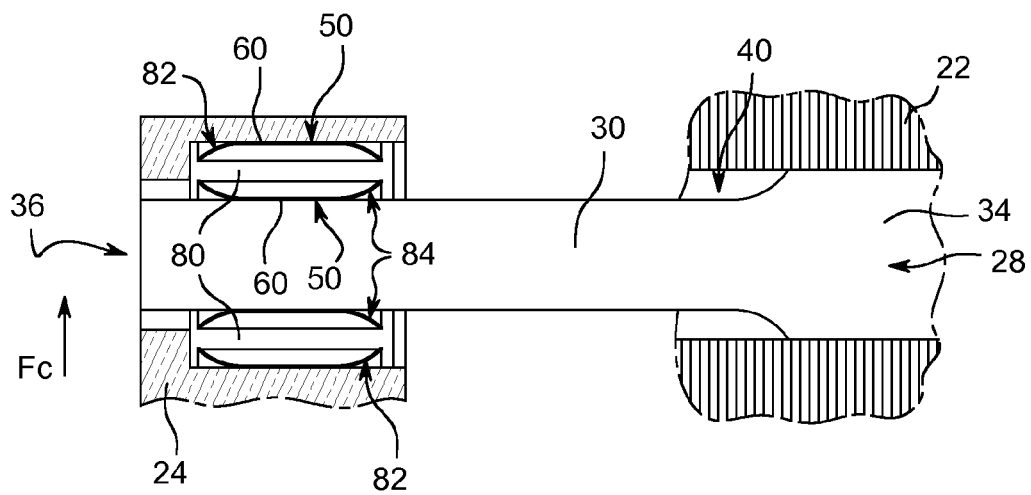

FIG. 5 illustrates a second embodiment of embodiments of the invention for which elements identical to the first embodiment described beforehand are denoted by identical references and will not be described again. For example, the stop 62 and wall 64 thereof are also present in this second embodiment, opposite the end of the end part 30, 32 (to the far left in FIG. 5).

In accordance with this second embodiment at least one connection means 36, 38 comprises a bushing 80, a first group 82 of flexible blades, and a second group 84 of flexible blades, the blades 50 being electrically conductive and connected to the bushing 80. The first group of blades 82 is received at the outer periphery of the bushing 80 and in abutment against the respective short-circuit ring 24, 26, and the second group of blades 84 is received at the inner periphery of the bushing 80 and in abutment against the respective end part 30, 32 of the corresponding bar 28.

The bushing 80 has, in the plane transverse to the axis of rotation X-X', a section of shape substantially identical to that of the section of the outer part 30, 32 in said transverse plane.

The bushing 80 is for example in the shape of a cylinder when the corresponding end part 30, 32 has a substantially circular section.

In an additional variant (not shown) at least two first groups 82 of blades are received at the outer periphery of the bushing 80 and in abutment against the short-circuit ring 24, 26, the first groups 82 being arranged in succession along the pivot axis R substantially parallel to the axis of rotation X-X'. The bushing 80 then comprises an intermediate part extending in a plane substantially perpendicular to the axis R and disposed between two first successive groups 82. In other words, the connection means 36, 38 then comprises a number of rows of blades 50 externally of the bushing 80 and disposed in succession along the pivot axis R.

In an additional variant (not shown) and analogously, at least two first groups 84 of blades are received at the inner periphery of the bushing 80 and in abutment against the respective end part 30, 32 of the corresponding bar 28, the second groups 84 being arranged in succession along the pivot axis R substantially parallel to the axis of rotation X-X'. The number of second groups 84 is equal to 2 or 3. The bushing 80 then comprises an intermediate part extending in a plane substantially perpendicular to the pivot axis R and disposed between two second successive groups 84. In other words, the connection means 36, 38 then comprises a number of rows of blades 50 internally of the bushing 80 and disposed in succession along the pivot axis R.

The number of first groups 82 is not necessarily equal to the number of second groups 84. The connection means 36, 38 for example comprises just one first group 82 and two second groups 84, and the connection means 36, 38 is for example able to allow the circulation of a current of 2,000 A. In accordance with another indicative example, the connection means 36, 38 comprises two first groups 82 and three second groups 84, and the connection means 36, 38 is for example able to allow the circulation of a current of 3,000 A. A person skilled in the art will of course understand that the aforementioned current values given by way of indication are dependent not only on the number of first groups 82 and second groups 84, but also on the dimensions of the flexible blades 50 of each of the groups 82, 84.

The operation of the electric machine 10 in accordance with the second embodiment is identical to that of the first embodiment and will not be described again.

The advantages of the electric machine 10, in particular of the connection means 36, 38, in accordance with the second embodiment are similar to those of the first embodiment. The connection means 36, 38 in accordance with this second embodiment make it possible in addition to provide a plurality of rows of flexible blades 50 in succession along the pivot axis R substantially parallel to the axis of rotation X-X' and to thus increase the maximum value of current able to pass through the connection means 36, 38. The connection means 36, 38 in accordance with this second embodiment also make it possible to facilitate the assembly of said connection means 36, 38 between the short-circuit ring 24, 26 and the respective end part 30, 32 of the corresponding bar 28.

In a variant the function of the stop 62 limiting the radial displacement under the centrifugal force Fc of the end part 30, 32 is integrated into the bushing 80.

Figure 6:
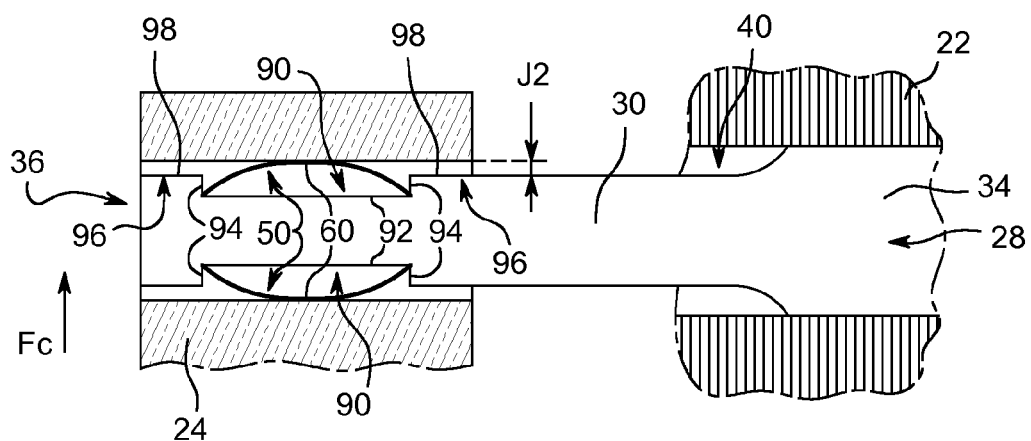

FIG. 6 illustrates a third embodiment of embodiments of the invention for which the elements identical to the first embodiment, described previously, are denoted by identical references and will not be described again.

In accordance with this third embodiment the flexible blades 50 of a respective connection means 36, 38 are received in a hollow 90 formed in the respective end part 30, 32 of the corresponding bar 28 and in abutment against the respective short-circuit ring 24, 26.

The hollow 90 comprises a base 92 and two radial walls 94. The flexible blades 50 are held in the hollow 90 for example with prestress, being applied against the radial walls 94. In the unstressed state of the blades 50, the central part 60 thereof extends outside the hollow 90 and is in abutment against the corresponding short-circuit ring 24, 26.

In a variant the flexible blades 50 are glued in the hollow 90 and do not require any prestress in the absence of the short-circuit ring 24, 26. In this case, in the absence of the short-circuit ring 24, 26, the blades 50 are not in contact with the radial walls 94.

In addition, the connection means 36, 38 comprise at least one stop 96 suitable for limiting a radial displacement of the end part 30, 32 under the centrifugal force Fc when the rotor 16 is driven in rotation in order to limit the crushing of the flexible blades 50, whilst limiting the deflection and associated stress under centrifugal force of the bar 28. This stop 96 is for example formed by a surface of the end part 30, 32, of which the normal is directed radially inwardly. In the present case, the stop 96 is formed by a wall 98 adjacent to the radial wall 94.

Thus, the connection means 36, 38, comprising the electrically conductive flexible blades 50, make it possible to assure an electrical contact between the corresponding end part 30, 32 of the conductive bar 28 and the corresponding short-circuit ring 24, 26, whatever the operating mode of the electric machine 10, including when the rotor 16 is not driven in rotation, or at low rotational speed.

When the rotor 16 is not driven in rotation, the corresponding short-circuit ring 24, 26 is in abutment against the flexible blades 50, more specifically against the central part 60 of the blades.

In this state, the end part 30, 32 and the associated short-circuit ring 24, 26 form a clearance J2 (FIG. 6) enabling a displacement radially outwardly of the end part 30, 32 against the force of some of the blades 50. The clearance J2, similarly to the clearance J1 of the first embodiment, between the stop 96 with its wall 98 and the short-circuit ring 24, 26 limits the radial displacement of the end part 30, 32 under the centrifugal force Fc, thus limiting the stresses in the bar 28 and the blades 50.

Is thus understood that the rotor 16 of the electric machine 10 according to embodiments of the invention makes it possible to improve the electrical contact between the conductive bars 28 and the rings 24, 26 of the short-circuit cage 20, moreover for a very wide range of rotational speeds of the rotor 16, ranging from standstill to very high rotational speeds, for example from 3,000 revolutions per minute to 20,000 revolutions per minute.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor for an electric machine, extending along an axis of rotation and comprising:
    a short-circuit cage comprising at least one bar; and
    at least one first electrical short-circuit ring, the or each bar comprising a first end part, the first end part being connected to the first short-circuit ring electrically by a first connection and radially with respect to the axis of rotation, wherein the or each first connection between a respective first end part and the first short-circuit ring comprises a plurality of flexible electrically conductive blades, the flexible blades of a respective connection being disposed along at least half of the periphery, in a transverse plane perpendicular to the axis of rotation, of the corresponding end part.

2. The rotor as claimed in claim 1, wherein the short-circuit cage comprises a second electrical short-circuit ring, the or each bar comprising a second end part, the second end part being connected to the second short-circuit ring electrically by a second connection and radially with respect to the axis of rotation, the or each second connection means between a respective second end part and the second short-circuit ring also comprising a plurality of flexible electrically conductive blades.

3. The rotor as claimed in claim 1, wherein the flexible blades are disposed along at least three quarters of the periphery in the transverse plane of said end part.

4. The rotor as claimed in claim 1, wherein each flexible blade is movable in rotation about a pivot axis substantially parallel to the axis of rotation.

5. The rotor as claimed in claim 1, wherein the flexible blades of a respective connection are mechanically and electrically connected to one another by at least one holding strip.

6. The rotor as claimed in claim 5, wherein the flexible blades of a respective connection are divided into a first set and a second set, the blades of the first set being connected to one another by a first holding strip and the blades of the second set being connected to one another by a second holding strip.

7. The rotor as claimed in claim 4, wherein the blades of the first set are movable in rotation about the pivot axis thereof in a first direction, and the blades of the second set are movable in rotation about the pivot axis thereof in a second direction, which is opposite the first direction.

8. The rotor as claimed in claim 1, wherein at least one connection comprises a bushing and at least two groups of flexible blades, which are electrically conductive and connected to the bushing, at least one first group of blades being received at the outer periphery of the bushing and in abutment against the respective short-circuit ring, and at least one second group of blades being received at the inner periphery of the bushing and in abutment against the respective end part of the corresponding bar.

9. The rotor as claimed in claim 1, wherein the flexible blades of a respective connection are received in a hollow formed in the respective short-circuit ring and in abutment against the respective end part of the corresponding bar.

10. The rotor as claimed in claim 1, wherein the flexible blades of a respective connection are received in a hollow formed in the respective end part of the corresponding bar and in abutment against the respective short-circuit ring.

11. An electric machine, comprising a stator and a rotor wherein the rotor extends along an axis of rotation and comprises:
    a short-circuit cage comprising at least one bar; and
    at least one first electrical short-circuit ring, the or each bar comprising a first end part, the first end part being connected to the first short-circuit ring electrically by a first connection and radially with respect to the axis of rotation, wherein the or each first connection between a respective first end part and the first short-circuit ring comprises a plurality of flexible electrically conductive blades, the flexible blades of a respective connection being disposed along at least half of the periphery, in a transverse plane perpendicular to the axis of rotation, of the corresponding end part.

* * * * *